(12) United States Patent
Mishra et al.

(10) Patent No.: US 7,984,040 B2
(45) Date of Patent: Jul. 19, 2011

(54) METHODS AND SYSTEMS FOR QUERYING EVENT STREAMS USING MULTIPLE EVENT PROCESSORS

(75) Inventors: Shailendra Mishra, Fremont, CA (US); Anand Srinivasan, Bangalore (IN); Namit Jain, Santa Clara, CA (US)

(73) Assignee: Oracle International Corporation, Redwood Shores, CA (US)

(*) Notice: Subject to any disclaimer, the term of this patent is extended or adjusted under 35 U.S.C. 154(b) by 474 days.

(21) Appl. No.: 12/133,899

(22) Filed: Jun. 5, 2008

(65) Prior Publication Data

US 2009/0037370 A1    Feb. 5, 2009

Related U.S. Application Data

(60) Provisional application No. 60/942,131, filed on Jun. 5, 2007.

(51) Int. Cl.
*G06F 17/30* (2006.01)
*G06F 7/00* (2006.01)

(52) U.S. Cl. ........................................ 707/713
(58) Field of Classification Search .................. None
See application file for complete search history.

(56) References Cited

U.S. PATENT DOCUMENTS

| 2004/0193608 A1* | 9/2004 | Gollapudi et al. ............... 707/10 |
| 2006/0282695 A1* | 12/2006 | Mital et al. .................... 713/502 |
| 2009/0172014 A1* | 7/2009 | Huetter ....................... 707/103 R |

* cited by examiner

*Primary Examiner* — Uyen T. Le
(74) *Attorney, Agent, or Firm* — Kilpatrick Townsend & Stockton LLP

(57) ABSTRACT

In one embodiment, a system for distributed event processing includes a first event processor and a second event processor. The first event processor receives event data associated with an event stream. The second event processor receives a query associated with the event stream. A request to the first event processor is generated by the second event processor based on the query for a first portion of event data associated with the event stream. The second event processor receives the first portion of event data from the first event processor. The second event processor then generates an event based on the first portion of event data.

21 Claims, 10 Drawing Sheets

630

SELECT * FROM STREAM 350, STREAM 360
    [Range 5min, Slide 1min]
    WHERE STREAM 350.X == STREAM 360.Y

METHODS AND SYSTEMS FOR QUERYING EVENT STREAMS USING MULTIPLE EVENT PROCESSORS

BACKGROUND OF THE INVENTION

The present invention relates to event stream processing. More specifically, the present invention relates to techniques for distributed event processing.

In most real-time applications, event data is typically represented as a continuous data stream rather than a fixed data set. The need for query processing over streaming event data is therefore fundamental. In general, continuous query systems treat queries as fixed entities and event data as the data streams over these fixed queries. This approach generally delivers results or events as they are computed. For example, an airline system might process event feeds of flight positions and weather, monitoring, constantly analyzing, and looking for conditions that provoke action, such as to propose a new flight route or rebook a passenger.

FIG. 1 depicts operations of an event processor 100 in the prior art. In this example, event processor 100 includes a stream processing application 110 that monitors two event streams, event stream 120 and event stream 130. In general, event processor 100 analyzes event data associated with event streams 120 and 130 to generate events. These events are typically defined in terms of predefined criteria that are expressed as event rules.

Typically, as stream processing application 110 analyzes event streams A and B, event processor 100 generates events, creates derived events or forwards raw events, performs actions, and potentially acts upon opportunities and threats in real time. In one example of operation, stream processing application 110 performs an operation 140 on event stream 120. With the results of operation 140, stream processing application 110 performs an operation 150, such as a join or merge, with event data associated with event stream 130. Operations 140 and 150 performed by stream processing application 110 generate event 140. Event processor 100 may store event 160 and/or event data associated with event 160 in storage 180.

However, most continuous query systems generally don't scale because event data streams and queries by design need to be collocated. In classical event processing, if an event expressed in an event rule does not occur as a single event stream, multiple events streams have to be locally aggregated or collocated for the rules engines of continuous query systems to process the event data. For example, as shown in FIG. 1, event stream 120 and event stream 130 are received in their entirety by event processor 100. However, if event processor 100 required only a small portion of event data associated with event streams 120 and 130, all of the event data associated with event streams 120 and 130 would still need to be propagated, merged, and then queried by event processor 100.

Accordingly, the collocation of multiple event streams and event streams that include large volumes of event data is achieved at huge performance and scalability costs. Event streams, such as real-time market data feeds from Wall Street and other global exchanges, can generate tens of thousands of messages per second. The dramatic escalation in feed volume breaks traditional continuous query systems, even though the underlying queries may not require all the data to be collocated. The escalation in feed volumes of collocated event streams can quickly overwhelm a continuous query system.

In some scenarios, collocation is not possible due to physical or other barriers. Moreover, collocation of events streams imports limits on the scalability of traditional event stream processing systems. In some industries, such as electronic trading, a latency of one second is considered unacceptable. Trading operation whose continuous query system require additional time for propagating and merging event streams for collocation increase any such latency, and thereby cause lost opportunities and lost profits.

Accordingly, what is desired are improved methods and apparatus for solving the problems discussed above, while reducing the drawbacks discussed above.

BRIEF SUMMARY OF THE INVENTION

The present invention relates to event stream processing. More specifically, the present invention relates to techniques for distributed event processing of event streams.

In one embodiment, a method for distributed event processing includes receiving a query associated with an event stream. Based on the query, a request to a first event processor is generated for a first portion of event data associated with the event stream. The first portion of event data is received at a second event processor. An event is then generated based on the first portion of event data.

In various embodiments, generating the request to the first event processor includes generating an instruction to the first event processor indicating to locally query the event stream to generate the first portion of event data. An instruction may be generated to the first event processor indicating to collocate a subset of the event stream at the second event processor.

In some embodiments, a first set of properties associated with the event stream are identified. A second set of properties that satisfy one or more heuristics are then identified from the first set of properties. The query is optimized in response to the second set of properties that satisfy the one or more heuristics. Optimizing the query in response to the second set of properties may include rewriting the query to use remote mapping. In some embodiments, optimizing the query in response to the second set of properties includes rewriting the query to use remote row sourcing.

In various embodiments, the event stream includes a virtual event stream having at least one event stream locally accessible to the first event processor and at least one event stream locally accessible to the second event processor. A second portion of event data associated with the event stream may also be received at the second event processor. Generating the event may then include generating the event based on the first portion of event data and the second portion of event data.

In one embodiment, a system for distributed event processing includes a first event processor and a second event processor. The first event processor receives event data associated with an event stream. The second event processor receives a query associated with the event stream. The second event processor generate a request to the first event processor for a first portion of event data associated with the event stream based on the query. The first portion of event data is then received at the second event processor. The second event processor may generate an event based on the first portion of event data.

In some embodiments, a computer program product is stored on a computer-readable medium configured to store instructions executable by a processor of a computer system for distributed event processing. The computer program product includes code for receiving a query associated with an event stream, code for generating, based on the query, a request to the first event processor for a first portion of event data associated with the event stream, code for receiving the first portion of event data at a second event processor, and code for generating an event based on the first portion of event data.

In various embodiments, systems and methods for distributed event stream processing allow event streams to be located wherever event data associated with the events streams originates. Aspects of some embodiments provide scalability because the entire event streams do not need to be collocated at another event processor to process queries over the event streams. In various embodiments, if only a subset of event data associated with an event stream is required by a query, the subset of event data may be collocated rather than the entire event stream and/or locally processed to obtain results for the query.

A further understanding of the nature and the advantages of the inventions disclosed herein may be realized by reference of the remaining portions of the specification and the attached drawings.

BRIEF DESCRIPTION OF THE DRAWINGS

In order to more fully understand the present invention, reference is made to the accompanying drawings. Understanding that these drawings are not to be considered limitations in the scope of the invention, the presently described embodiments and the presently understood best mode of the invention are described with additional detail through use of the accompanying drawings.

DETAILED DESCRIPTION OF THE INVENTION

The embodiments discussed herein are illustrative of one or more examples of the present invention. As these embodiments of the present invention are described with reference to illustrations, various modifications or adaptations of the methods and/or specific structures described may become apparent to those skilled in the art. All such modifications, adaptations, or variations that rely upon the teachings of the present invention, and through which these teachings have advanced the art, are considered to be within the scope of the present invention. Hence, the present descriptions and drawings should not be considered in a limiting sense, as it is understood that the present invention is in no way limited to only the embodiments illustrated.

In various embodiments, systems and methods for distributed event stream processing allow event streams to be located wherever event data associated with the events streams originates. Aspects of some embodiments provide scalability because the entire event streams do not need to be collocated at another event processor to process queries over the event streams. In various embodiments, if only a subset of event data associated with an event stream is required by a query, the subset of event data may be collocated rather than the entire event stream and/or locally processed to obtain results for the query.

In one embodiment, a system for distributed event processing includes a plurality of event streams and a plurality of event processors. A first event processor is configured to receive event data associated with an event stream. A query associated with the event stream is received at a second event processor. A request to the first event processor for a first portion of event data associated with the event stream is generated based the query. The first portion of event data is then received at the second event processor. The second event processor generates an event based on the first portion of event data.

Figure 1:
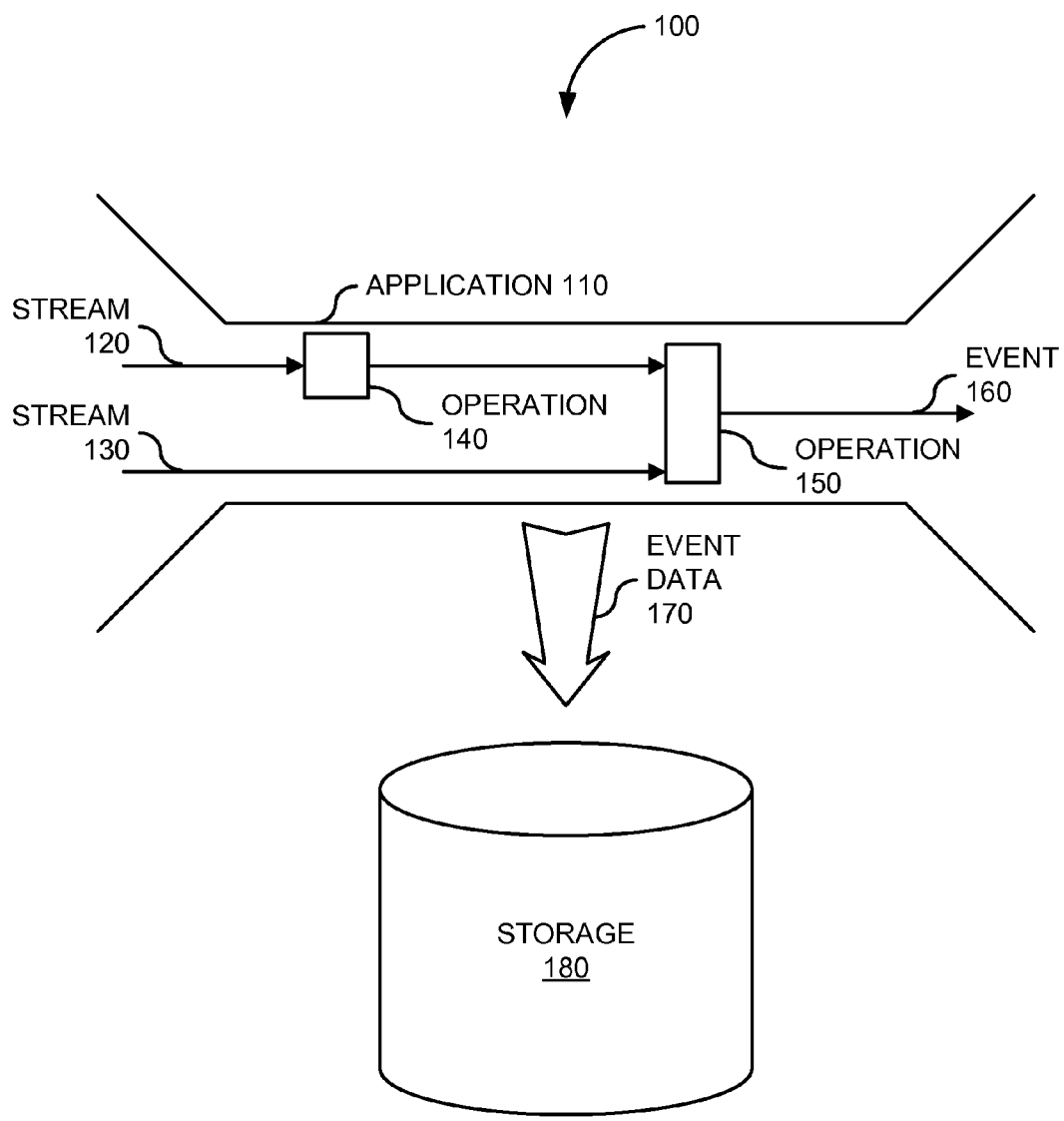
FIG. 1 depicts operations of an event processor in the prior art.
Figure 2:
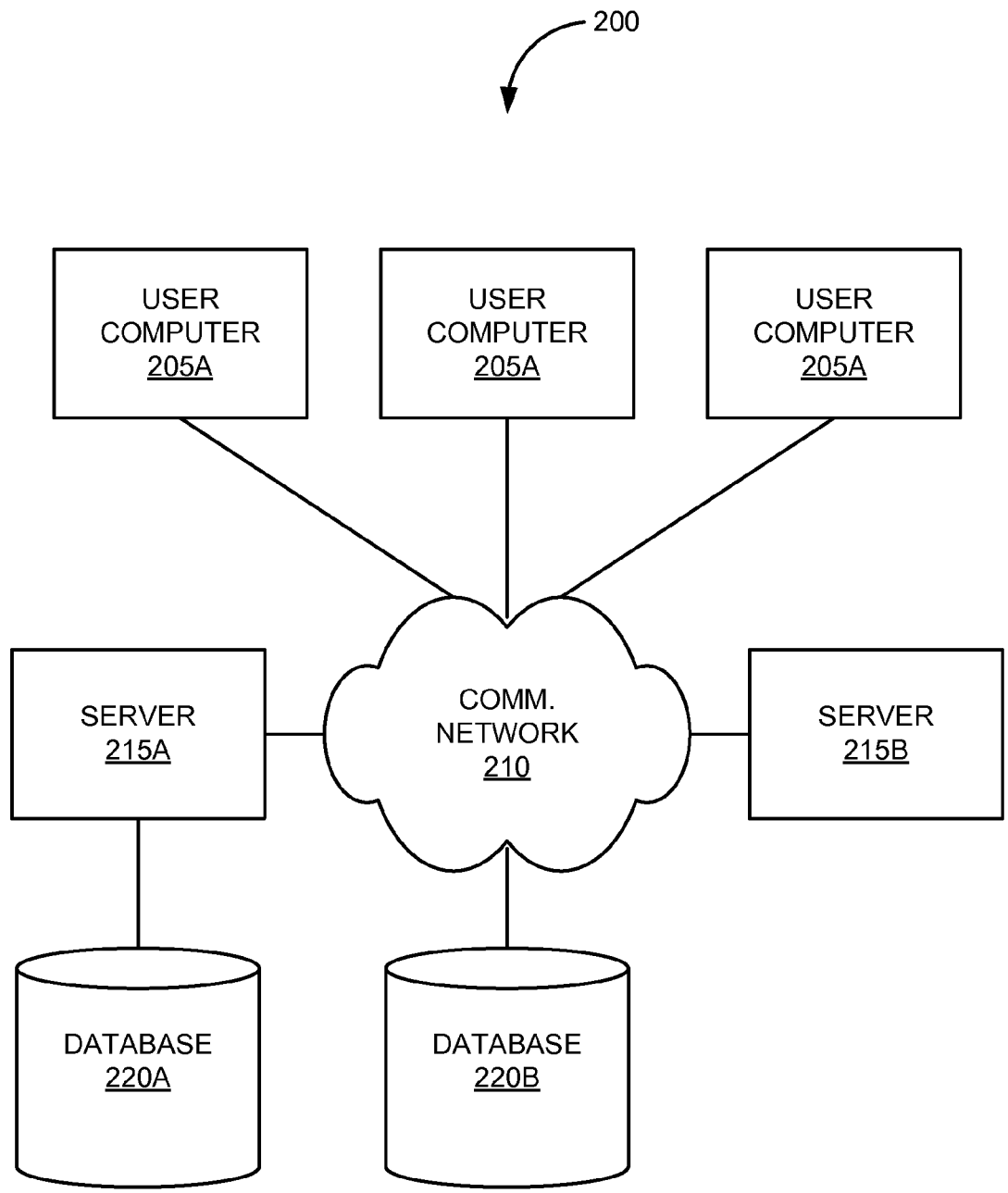
FIG. 2 is a simplified illustration of a system that may incorporate an embodiment of the present invention.

FIG. 2 is a simplified illustration of system 200 that may incorporate an embodiment of the present invention. FIG. 200 is merely illustrative of an embodiment incorporating the present invention and does not limit the scope of the invention as recited in the claims. One of ordinary skill in the art would recognize other variations, modifications, and alternatives.

In one embodiment, system 200 includes one or more user computers 205 (e.g., computers 205A, 205B, and 205C). User computers 205 can be general purpose personal computers (including, merely by way of example, personal computers and/or laptop computers running any appropriate flavor of Microsoft Corp.'s Windows™ and/or Apple Corp.'s Macintosh™ operating systems) and/or workstation computers running any of a variety of commercially-available UNIX™ or UNIX-like operating systems. These user computers 205 can also have any of a variety of applications, including one or more applications configured to perform methods of the invention, as well as one or more office applications, database client and/or server applications, and web browser applications.

Alternatively, user computers 205 can be any other electronic device, such as a thin-client computer, Internet-enabled mobile telephone, and/or personal digital assistant, capable of communicating via a network (e.g., communications network 210 described below) and/or displaying and navigating web pages or other types of electronic documents. Although the exemplary system 200 is shown with three user computers, any number of user computers or devices can be supported.

Certain embodiments of the invention operate in a networked environment, which can include communications network 210. Communications network 210 can be any type of network familiar to those skilled in the art that can support data communications using any of a variety of commercially-available protocols, including without limitation TCP/IP, SNA, IPX, AppleTalk, and the like. Merely by way of example, communications network 210 can be a local area network ("LAN"), including without limitation an Ethernet network, a Token-Ring network and/or the like; a wide-area network; a virtual network, including without limitation a virtual private network ("VPN"); the Internet; an intranet; an extranet; a public switched telephone network ("PSTN"); an infra-red network; a wireless network, including without limitation a network operating under any of the IEEE 802.11 suite of protocols, the Bluetooth™ protocol known in the art, and/or any other wireless protocol; and/or any combination of these and/or other networks.

Embodiments of the invention can include one or more server computers 215 (e.g., computers 215A and 215B). Each of server computers 215 may be configured with an operating system including without limitation any of those discussed above, as well as any commercially-available server operating systems. Each of server computers 215 may also be running one or more applications, which can be configured to provide services to one or more clients (e.g., user computers 205) and/or other servers (e.g., server computers 215).

Merely by way of example, one of server computers 215 may be a web server, which can be used, merely by way of example, to process requests for web pages or other electronic documents from user computers 205. The web server can also run a variety of server applications, including HTTP servers, FTP servers, CGI servers, database servers, Java servers, and the like. In some embodiments of the invention, the web server may be configured to serve web pages that can be operated within a web browser on one or more of the user computers 205 to perform methods of the invention.

Server computers 215, in some embodiments, might include one or more file and or/application servers, which can include one or more applications accessible by a client running on one or more of user computers 205 and/or other server computers 215. Merely by way of example, one or more of server computers 215 can be one or more general purpose computers capable of executing programs or scripts in response to user computers 205 and/or other server computers 215, including without limitation web applications (which might, in some cases, be configured to perform methods of the invention).

Merely by way of example, a web application can be implemented as one or more scripts or programs written in any programming language, such as Java™, C, C#™ or C++, and/or any scripting language, such as Perl, Python, or TCL, as well as combinations of any programming/scripting languages. The application server(s) can also include database servers, including without limitation those commercially available from Oracle, Microsoft, Sybase™, IBM™ and the like, which can process requests from database clients running on one of user computers 205 and/or another of server computer 215.

In some embodiments, an application server can create web pages dynamically for displaying the information in accordance with embodiments of the invention. Data provided by an application server may be formatted as web pages (comprising HTML, XML, Javascript, AJAX, etc., for example) and/or may be forwarded to one of user computers 205 via a web server (as described above, for example). Similarly, a web server might receive web page requests and/or input data from one of user computers 205 and/or forward the web page requests and/or input data to an application server.

In accordance with further embodiments, one or more of server computers 215 can function as a file server and/or can include one or more of the files necessary to implement methods of the invention incorporated by an application running on one of user computers 205 and/or another of servers 215. Alternatively, as those skilled in the art will appreciate, a file server can include all necessary files, allowing such an application to be invoked remotely by one or more of user computers 205 and/or server computers 215. It should be noted that the functions described with respect to various servers herein (e.g., application server, database server, web server, file server, etc.) can be performed by a single server and/or a plurality of specialized servers, depending on implementation-specific needs and parameters.

In certain embodiments, system 200 can include one or more databases 220 (e.g., databases 220A and 220B). The location of the database(s) 220 is discretionary: merely by way of example, database 220A might reside on a storage medium local to (and/or resident in) server computer 215A (and/or one or more of user computers 205). Alternatively, database 220B can be remote from any or all of user computers 205 and server computers 215, so long as it can be in communication (e.g., via communications network 210) with one or more of these. In a particular set of embodiments, databases 220 can reside in a storage-area network ("SAN") familiar to those skilled in the art. (Likewise, any necessary files for performing the functions attributed to user computers 205 and server computers 215 can be stored locally on the respective computer and/or remotely, as appropriate). In one set of embodiments, one or more of databases 220 can be a relational database, such as an Oracle™ database, that is adapted to store, update, and retrieve data in response to SQL-formatted commands. Databases 220 might be controlled and/or maintained by a database server, as described above, for example.

Figure 3:
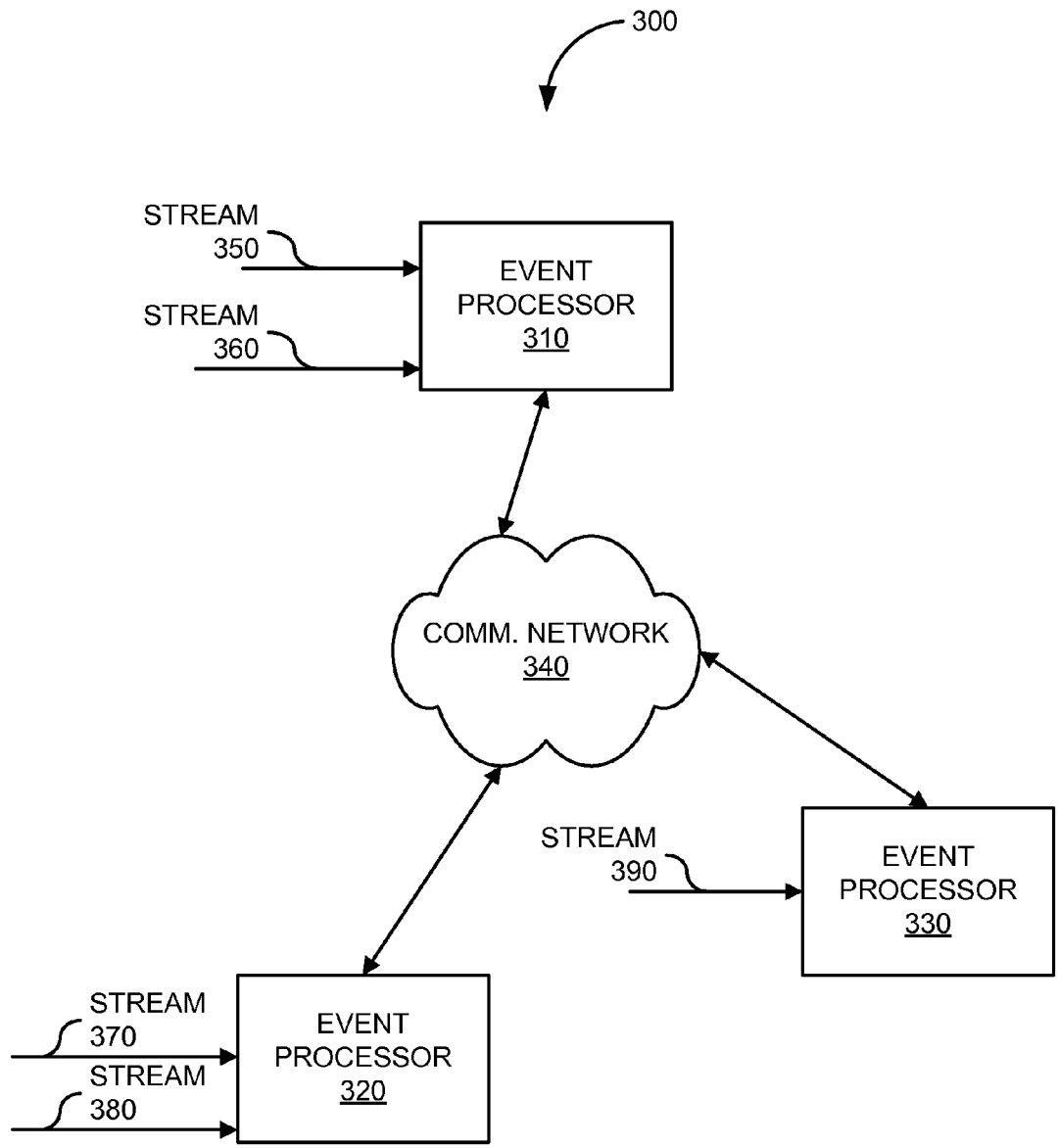
FIG. 3 is a simplified block diagram of a system for distributed event processing in one embodiment according to the present invention.

FIG. 3 is a simplified block diagram of a system 300 for distributed event processing in one embodiment according to the present invention. FIG. 3 is merely illustrative of an embodiment incorporating the present invention and does not limit the scope of the invention as recited in the claims. One of ordinary skill in the art would recognize other variations, modifications, and alternatives.

In this example, system 300 includes event processors 310, 320, and 330 coupled by a communications network 340. Event processor 310 is configured to receive an event stream 350. Event processor 320 is configured to receive events streams 360, 360, and 380. Event processor 330 is configured to receive an event stream 390.

Figure 4:
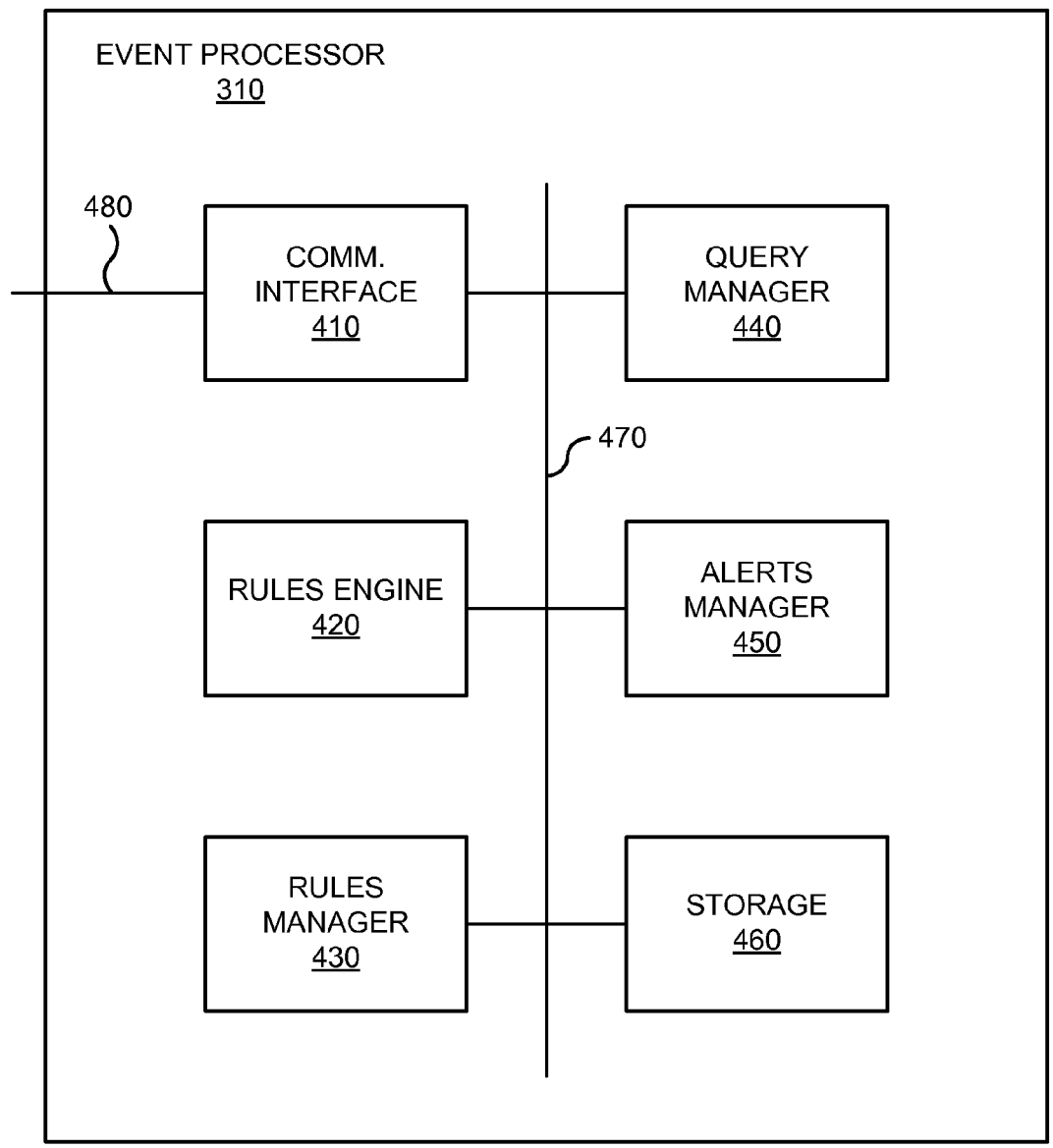
FIG. 4 is a block diagram of an event processor in the system of FIG. 2 in one embodiment according to the present invention.

Event processors 310, 320, and 330 include hardware and/or software elements configured to obtain event data associated with an event stream for the generation of one or more events. In general, an event stream is any sequence of data, signals, packets, messages, and the like. An event is any set of data, signals, packets, messages, and the like, that satisfy a predetermined criteria to be considered as a single object or entity. Some examples of event processors 310, 320, and 330 are personal computers (PCs), laptops, computer systems, embedded devices, workstations, mainframes, and the like. One example of event processor 310 is shown in FIG. 4.

Communications network 340 includes hardware and/or software elements configured to allow the exchange of data between event processors 310, 320, and 330. Some examples of communications network 340 are the Internet, Ethernet networks, FDDI networks, wireless networks, system and messaging buses, backplane interconnects, and the like.

In operation, system 300 receives queries associated with an event stream (e.g., event streams 350, 360, 370, 380, and 390). The event stream may be a single stream of event data, or the event stream may be a virtual event stream. A virtual event stream is any combination or set of two or more event streams.

System 300 determines whether an event stream is locally accessible to one of event processors 310, 320, and 330. In general, an event stream is locally accessible to an event processor if the event processor is configured to receive event data directly for the event stream. For example, event stream 350 received by event processor 310 is locally accessible to event processor 310. If an event stream is locally accessible, events may be generated by each of the event processors (e.g., event processors 310, 320, and 330) to which the event streams are locally accessible.

If an event stream from which event data is required is not locally accessible to an event processor which requires the event data, system 300 optimizes the queries to obtain the required event data from one or more event processors to which the event stream is locally accessible. In one example, if event processor 310 requires event data associated with event stream 370 which is locally accessible to event processor 320, event processor 310 requests the event data from event processor 320. Event processor 310 then may generate an event using the event data from event processor 320.

In various embodiments, system 300 allows event streams to be located wherever event data associated with the events streams originates. The entire set of event data associated with an event stream does not have to be collocated at the event processor that requires only a portion of the event data for processing to generate an event. In various embodiments, system 300 provides a subset of the event stream which is required.

In some embodiments, a distributed event stream processing system includes a plurality of interfaces that received a plurality of event streams. The system further includes a plurality of event processors that process the plurality of event streams to obtain one or more events. Each event processor in the system can receive a query associated with at least one event stream. An event processor may determine whether the event stream associated with the query is locally accessible to the event processor. If the event stream is not locally accessible to the event processor, the event processor obtains a portion of event data from another event processor to which the first event stream is locally accessible to generate an event.

FIG. 4 is a block diagram of event processor 310 in one embodiment according to the present invention. Event processor 310 includes a communications interface 410, a rules engine 420, a rules manager 430, a query manager 440, an alert manager 450, storage 460, and a communication bus 470. Communications interface 410, rules engine 420, rules manager 430, query manager 440, alert manager 450, and storage 460 are communicatively coupled by communications bus 470. Communications interface 410 is linked via line 480 to a communications network (e.g., communications network 340 of FIG. 3).

Communications interface 410 includes hardware and/or software elements configured to send and receive data. In one example, communications interface 410 receives event data from event stream 350 (FIG. 3) originating from a stream source (not shown). Communications interface 410 may receive event data from event processor 320 to which streams 360, 370, and 380 are locally accessible. Communications interface 410 may send event data from event stream 350 to event processors 320 and 330 via communications network 340. In this example, communications interface 410 communicates event data received from event stream 350 to stream processing engine 420.

Rules engine 420 includes hardware and/or software elements configured to process event data from an event stream to obtain information associated with one or more events. In some embodiments, rules engine 420 processes event data associated with non-locally accessible event streams. An event stream is considered local, or locally accessible to an event processor if the event processor is configured to receive the entire event stream (e.g., using communications interface 410).

Rule manager 430 includes hardware and/or software elements that manage rules that define events over one or more event streams. In general, a rule is any set of criteria that define an event. In some embodiments, rules manager 430 includes a user interface (e.g., a GUI) allowing a user or other computer process to create, update, manage, and execute rules.

Query manager 440 includes hardware and/or software elements that manages and executes queries over event data. A query is any type of signal, packet, message, and the like, that requests information. In some embodiments, query manager 440 interfaces with rules engine 420 to provide continuous query execution.

Alerts manager 450 includes hardware and/or software elements that manage alerts or notifications associated with an event. Storage 460 includes hardware and/or software elements that store data. Store 460 may store events, raw event data, derived events, alerts, notifications, and the like, and other information related to events.

In one example of operation, communications interface 410 receives event data associated with event stream 350 for event processor 310. Rules engine 420 processes the event data using one or more rules provided by a user or operator via rules manager 430 to generate an event. Rules engine 420 may store the event data associated with the event, or the event itself in storage 460. In various embodiments, alerts manager 450 may generate one or more alerts or notifications in response to the event.

Accordingly, system 300 allows event streams 350 to be located at event processor 310, without the entire set of event data associated with event stream 350 needing to be collocated at event processors that require only a portion of the event data for processing to generate an event. In various embodiments, system 300 provides a subset of the event stream which is required. The subset or portion of event data may include a partial collocation of event data or the results to a query.

Figure 5:
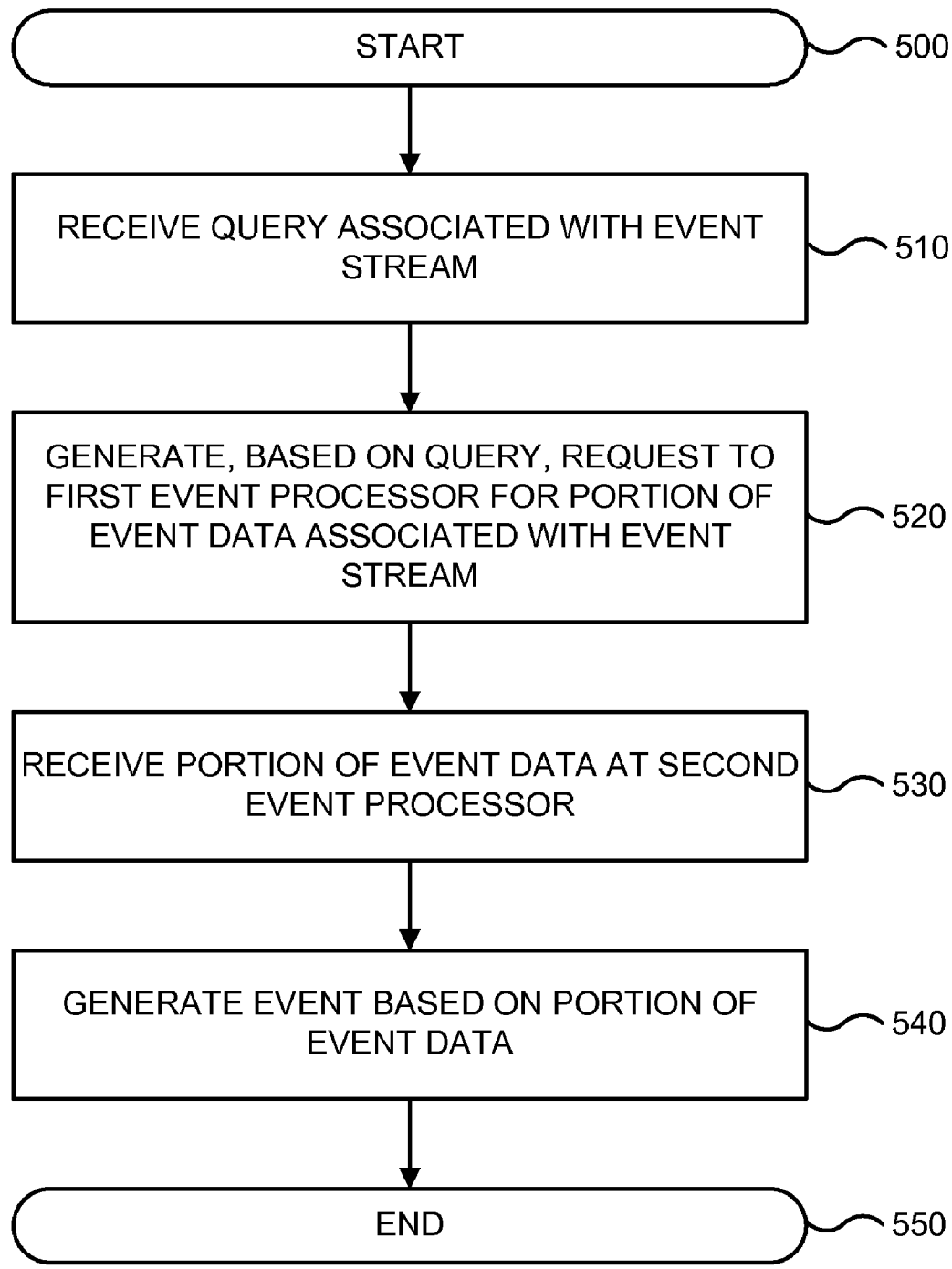
FIG. 5 is a simplified flowchart for distributed event processing in one embodiment according to the present invention.

FIG. 5 is a simplified flowchart for distributed event processing in one embodiment according to the present invention. The processing depicted in FIG. 5 may be performed by software modules (e.g., instructions or code) executed by a processor of a computer system, by hardware modules of the computer system, or combinations thereof. FIG. 5 begins in step 500.

In step 510, system 300 receives a query associated with an event stream (e.g., event stream 370). As discussed previously, an event stream may represent a single sequence of event data, or the event stream may represent a virtual event stream formed by two or more event streams. In various embodiments, the event streams forming a virtual event stream may be located at different event processors of system 300.

In step 520, system 300 generates, based on the query, a request to a first event processor (e.g., event processor 320) for a portion of event data associated with the event stream. The request may be generated based on a determination that the event stream is locally accessible to the first event processor (i.e., event stream 370 is locally accessible to event processor 320).

A request for a portion of event data is any signal, packet, instruction, message, or query indicating to the event processor to obtain the portion of event data. In some embodiments, the request includes an instruction indicating to the event processors to which the event stream is locally accessible to processes a query to locally obtain the portion of event data. In various embodiments, the request includes an instruction indicating to the event processors to which the event stream is locally accessible to send a subset of the event stream for collocation to obtain the portion of event data.

In step 530, system 300 receives the portion of event data at a second event processor (e.g., event processor 310). In one example, event processor 310 receives the portion of event data as the results of a query locally executed by event processor 320 over event stream 370. Event processor 310 may then merge the portion of event data with other results obtained locally by event processor 310. In another example, event processor 310 receives the portion of event data as a subset of event stream 370 for collocation at event processor 310. Event processor 310 may then process the subset of event stream 370 as raw event data over which the query is executed.

In step 540, system 300 generates an event based on the portion of event data. FIG. 5 ends in step 560.

In various embodiments, system 300 receives a query from a user, operator, or computer process, for execution as a continuous query over one or more event streams. In general, a continuous query operates over event streams as event data is received. Typically a window defining the scope or time frame of operations of a query is used.

Figures 6A, 6B:
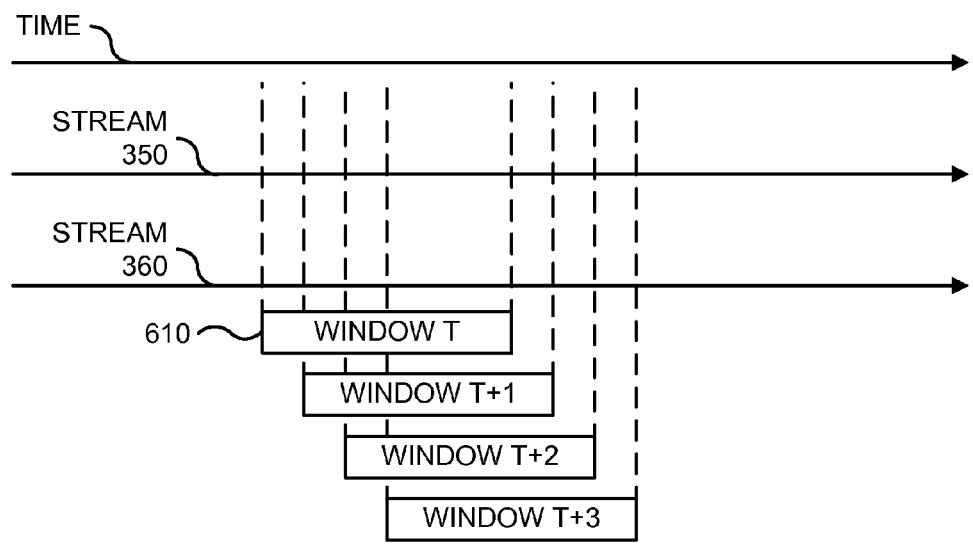
FIG. 6A depicts using a window during event stream processing to define the scope of operations in one embodiment according to the present invention.
FIG. 6B depicts an exemplary query using the window of FIG. 5A, which may be executed for distributed event processing by various embodiments of the present invention.

FIG. 6A depicts using a window 610 during event stream processing to define the scope of operations in one embodiment according to the present invention. In this example, window 610 is defined by a range T (e.g., 5 minutes), over which event data is collected. In one example, event processor 310 processes or executes the query over the event data within window 610.

Window 610 may "slide" or move over time. In one example, window 610 slides every minute. As shown in FIG. 6A, window 610 slides over time at T+1, T+2, and T+3. The rate at which window 610 slides may be adjusted based on a variety of criteria, such as the type of event, the size or volume of event data received, the rate of sampling, and the like.

FIG. 6B depicts an exemplary query 620 using the window of FIG. 6A, which may be executed for distributed event processing by various embodiments of the present invention. In general, query 620 may be formatted according to continuous query languages, such as SQL, CQL, and the like. In this example, query 620 includes the following:

SELECT * FROM STREAM 350, STREAM 360
   [Range: 5 min, Slide: 1 min]
   WHERE STREAM 350.X==STREAM 360.Y As shown in FIG. 6B, query 620 operates to find all events or data from streams 350 and stream 360 where X from stream 350 is equivalent to Y from stream 360, during a 5 minute window that slides every 1 minute. Accordingly, events that match the criteria X==Y over the given time frame from local streams 350 and 360 are then generated for subsequent storage, display to a user, or for further processing.

In various embodiments, queries received by event processor 310 of system 300 may be associated with one or more event streams that are not locally accessible to event processor 310 (e.g., event stream 370). For example, if query 610 is associated with event stream 370, event processor 310 optimizes query 610 to obtain a portion of event data from event processor 320 to which event stream 370 is locally accessible. Accordingly, only a subset of event data associated with event streams (e.g., event stream 370) is required to be transmitted to or collocated at event processor 310 to generate an event.

Figure 7:
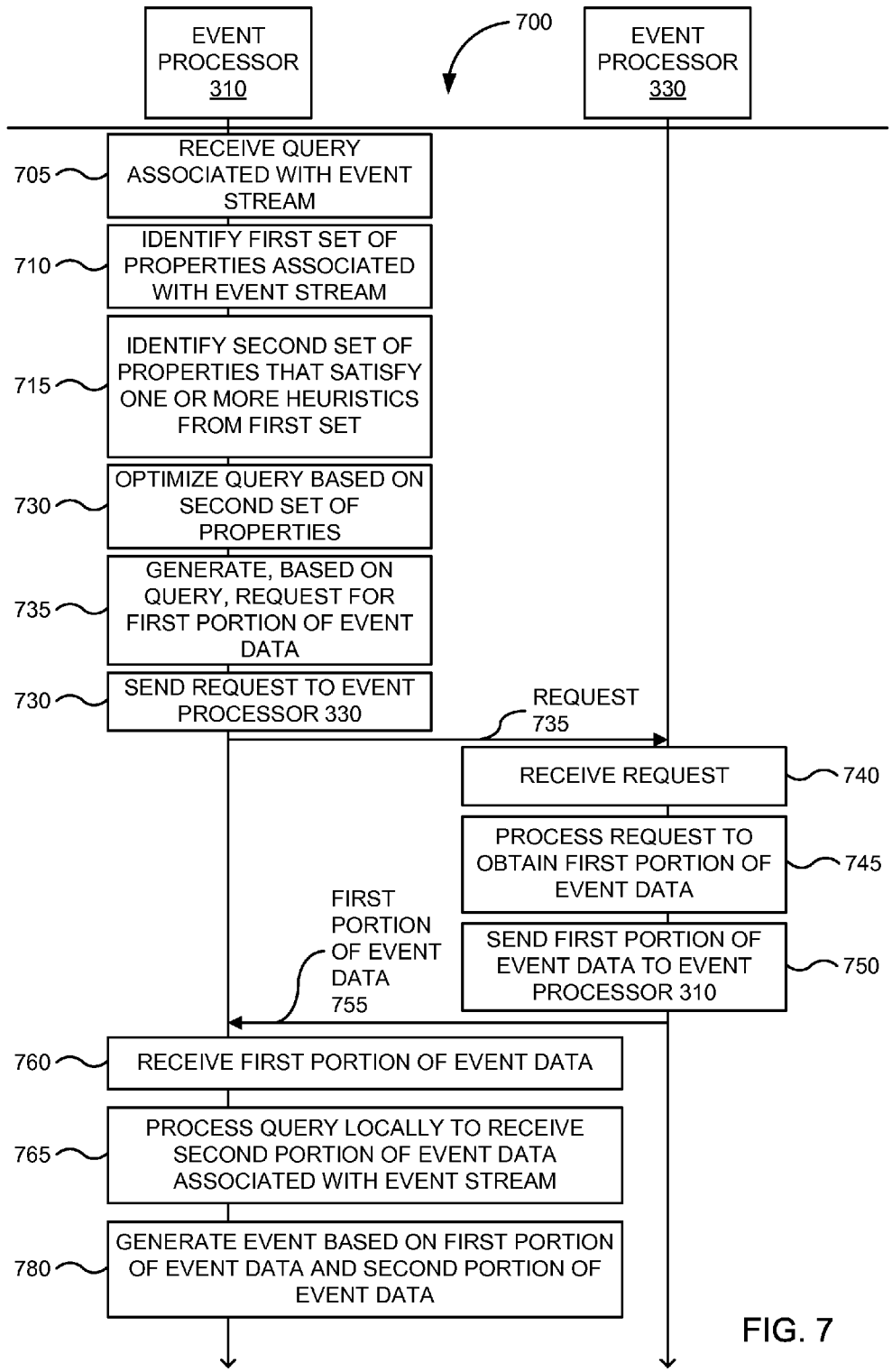
FIG. 7 is a message sequence chart illustrating distributed event processing in one embodiment according to the present invention.

FIG. 7 is a message sequence chart 700 illustrating distributed event processing in one embodiment according to the present invention. While processing may be depicted in FIG. 7 as occurring sequentially, one ordinarily skilled in the art will understand that in various embodiments, all or some of the processing or sequencing performed by event processor 310 and event processor 320 may occur in parallel.

In step 705, event processor 310 receives a query associated with an event stream (e.g., a virtual event stream including event stream 350 and event stream 370). In step 710, event processor 310 identifies a first set of properties associated with the event stream. Some examples of properties associated with an event stream are identifiers associated with a stream, stream source, encryption parameters, security information, stream composition, volume and timing of event data, subscription information, and the like. In one example, event processor 310 determines that the event stream is a virtual event stream. Event processor 310 determines that the virtual event stream includes event stream 350, which is locally accessible to event processor 310, and event stream 370, which is locally accessible to event processor 320.

In step 715, event processor identifies a second set of properties that satisfy one or more heuristics from the first set of properties. A heuristic may be any indicator, rule, and criteria that matches a property associated with an event stream.

In step 720, event processor 310 optimizes the query based on the second set of properties that satisfy the one or more heuristics. In various embodiments, event processor 310 optimizes the query by rewriting the query for execution in the distributed environment of system 300.

In general, event processor 310 optimizes the query by rewriting the query using remote mapping and remote row sourcing. As discussed further below, remote mapping allows event processor 310 to take the query over locally accessible event streams, ship the query to event processors associated with non-locally accessible events streams, and received the results of the non-locally executed query to be merged with the results locally obtained. Remote row sourcing allows event processor 310 to obtain raw event data over which to execute the query. For example, event processor 310 rewrites the query to collocate a subset of a non-locally accessible event stream at event processor 310.

In step 725, event processor 310 generates, based on the query, a request to event processor 320 for a portion of event data associated with event stream 370. A request is any signal, packet, or data indicating an instruction, message, or operation to be performed at an event processor to obtain the portion of event data at another event processor. In step 730, event processor 310 sends message 735 to event processor 320.

In step 740, event processor 320 receives request 735. In step 745, event processor 320 processes the request to obtain a first portion of event data. Some examples of operation of event processor 320 in regard to processing the request are discussed with respect to FIGS. 7 and 8. In step 750, event processor 320 sends first portion of event data 755 to event processor 310.

In step 770, event processor 310 receives the first portion of event data. In step 775, event processor 310 processes the query locally to receive a second portion of event data associated with event stream event stream 350. In step 780, event processor 310 generates an event based on the first portion of event data received from event processor 320 and the second portion of event data locally obtained at event processor 310.

In some embodiments, event processor 310 may store the event, or forward the event and/or event data to a user or other computer process. In various embodiments, event processor 310 generates a response to the query using event. Event processor 310 may also generate an alert, notification, or other status indicator for recording, printing, or display to a user.

Figure 8:
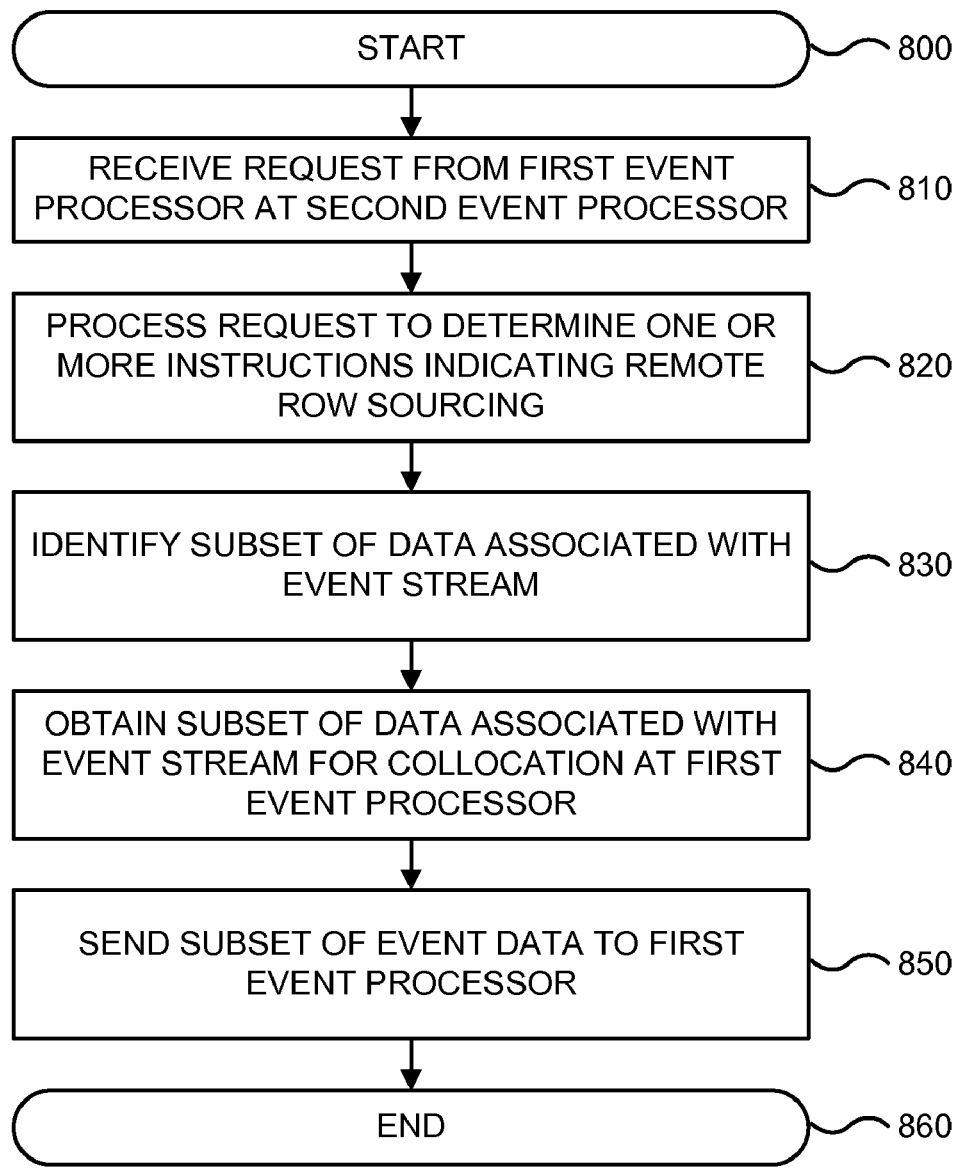
FIG. 8 is a flowchart for distributed event processing using remote row sourcing in one embodiment according to the present invention.

FIG. 8 is a flowchart for distributed event processing using remote row sourcing in one embodiment according to the present invention. FIG. 8 begins in step 800.

In step 810, a request is received from a first event processor (e.g., event processor 310) at a second event processor (e.g., event processor 320). In step 820, event processor 320 processes the request to determine one or more instructions indicating remote row sourcing. In general, remote row sourcing allows an event processor to optimize a query in order to collocate only a subset of event data associated with an event stream from another event processor in system 300. The event processor then may perform continuous queries using the collocated subset of data, without the overhead and performance costs of collocating the entire event stream.

In step 830, event processor 320 identifies a subset of data associated with the stream. In step 840, event processor 320 obtains the subset of data associated with the event stream for collocation at event processor 310. In step 850, event processor 320 sends the subset of event data to event processor 310.

In various embodiments, event processor 320 queues the subset of event data for transmission to event processor 310 at predetermined intervals. In some embodiments, event processor 320 establishes a temporary event stream originating at event processor 320 for collocation at event processor 310. FIG. 8 ends in step 860.

Figure 9:
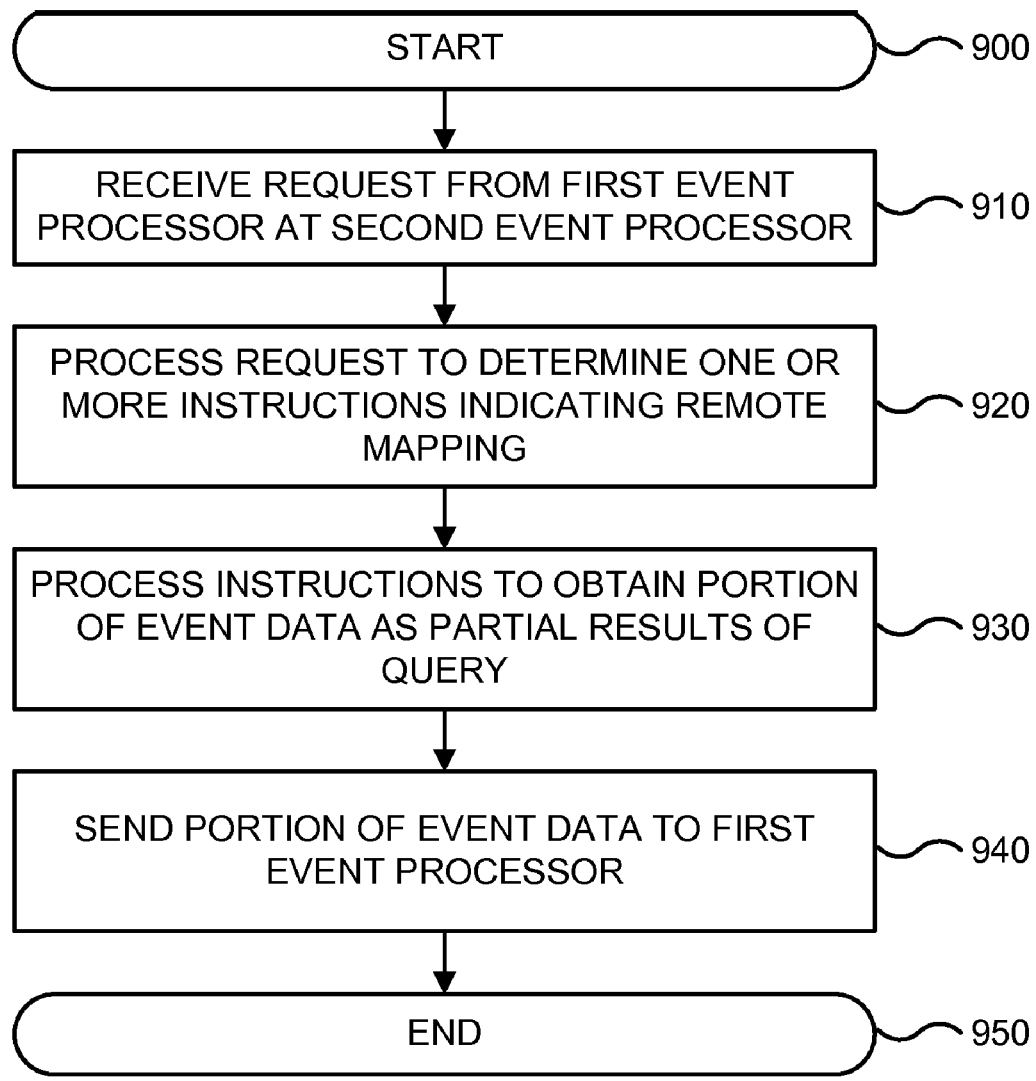
FIG. 9 is a flowchart for distributed event processing using remote mapping in one embodiment according to the present invention.

FIG. 9 is a flowchart for distributed event processing using remote mapping in one embodiment according to the present invention. FIG. 9 begins in step 900.

In step 910, a request is received from a first event processor (e.g., event processor 310) at a second event processor (e.g., event processor 320). In step 920, event processor 320 processes the request to determine one or more instructions indicating remote mapping. In general, remote mapping allows an event processor optimize a query in order to perform the query locally, ship the optimized query to another event processor to obtain a set of results, and use the set of results to generate an event in response to the query. The event processor may perform further processing on the results of the shipped query or merge the set of results with a locally generated set of results to generate the event.

In step 930, event processor 320 identifies processes the instructions to locally obtain a portion of event data as partial results of the query. In step 940, event processor 320 sends the portion of event data as partial results to event processor 310. FIG. 9 ends in step 950.

A plurality of heuristics can be used for optimizing queries that may be executed for distributed event processing by various embodiments of the present invention. In general, a heuristic allows system 300 to determine how to optimize a query based on properties of event streams. In some embodiments, system 300 may optimize a query using the fact that an event stream is a virtual event stream. In various embodiments, system 300 optimizes a query to reduce delay, increase locality of event data, and improve overall performance.

Figure 10:
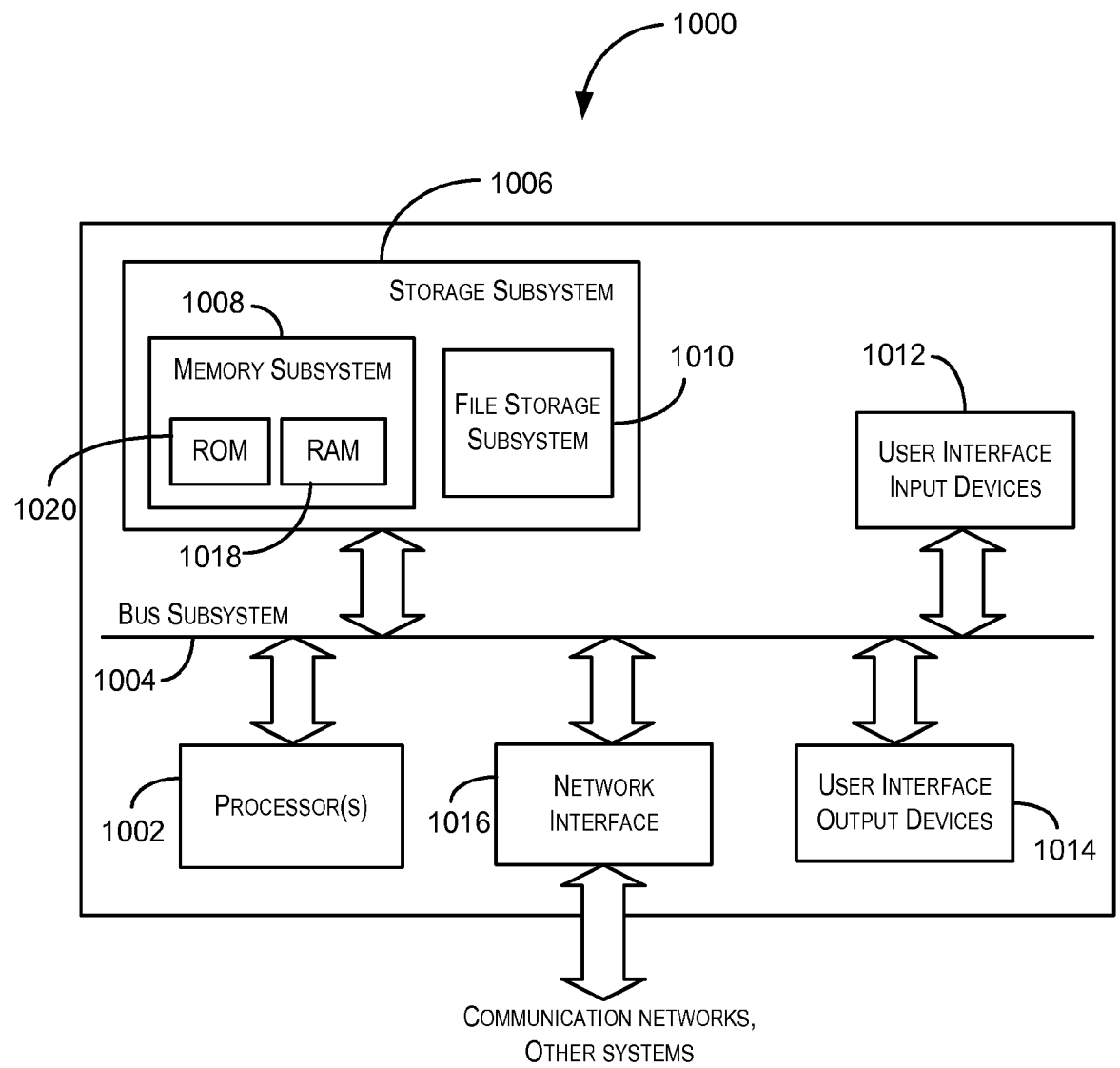
FIG. 10 is a simplified illustration of a system that may incorporate an embodiment of the present invention.

FIG. 10 is a simplified block diagram of a computer system 1000 that may be used to practice embodiments of the present invention. As shown in FIG. 10, computer system 1000 includes a processor 1002 that communicates with a number of peripheral devices via a bus subsystem 1004. These peripheral devices may include a storage subsystem 1006, comprising a memory subsystem 1008 and a file storage subsystem 1010, user interface input devices 1012, user interface output devices 1014, and a network interface subsystem 1016.

Bus subsystem 1004 provides a mechanism for letting the various components and subsystems of computer system 1000 communicate with each other as intended. Although bus subsystem 1004 is shown schematically as a single bus, alternative embodiments of the bus subsystem may utilize multiple busses.

Network interface subsystem 1016 provides an interface to other computer systems, and networks, and devices. Network interface subsystem 1016 serves as an interface for receiving data from and transmitting data to other systems from computer system 1000.

User interface input devices 1012 may include a keyboard, pointing devices such as a mouse, trackball, touchpad, or graphics tablet, a scanner, a barcode scanner, a touchscreen incorporated into the display, audio input devices such as voice recognition systems, microphones, and other types of input devices. In general, use of the term "input device" is intended to include all possible types of devices and mechanisms for inputting information to computer system 1000.

User interface output devices 1014 may include a display subsystem, a printer, a fax machine, or non-visual displays such as audio output devices, etc. The display subsystem may be a cathode ray tube (CRT), a flat-panel device such as a liquid crystal display (LCD), or a projection device. In general, use of the term "output device" is intended to include all possible types of devices and mechanisms for outputting information from computer system 1000.

Storage subsystem 1006 may be configured to store the basic programming and data constructs that provide the functionality of the present invention. Software (code modules or instructions) that provides the functionality of the present invention may be stored in storage subsystem 1006. These software modules or instructions may be executed by processor(s) 1002. Storage subsystem 1006 may also provide a repository for storing data used in accordance with the present invention. Storage subsystem 1006 may comprise memory subsystem 1008 and file/disk storage subsystem 1010.

Memory subsystem 1008 may include a number of memories including a main random access memory (RAM) 1018 for storage of instructions and data during program execution and a read only memory (ROM) 1020 in which fixed instructions are stored. File storage subsystem 1010 provides persistent (non-volatile) storage for program and data files, and may include a hard disk drive, a floppy disk drive along with associated removable media, a Compact Disk Read Only Memory (CD-ROM) drive, a DVD, an optical drive, removable media cartridges, and other like storage media.

Computer system 1000 can be of various types including a personal computer, a portable computer, a workstation, a network computer, a mainframe, a kiosk, or any other data processing system. Due to the ever-changing nature of computers and networks, the description of computer system 1000 depicted in FIG. 10 is intended only as a specific example for purposes of illustrating the preferred embodiment of the computer system. Many other configurations having more or fewer components than the system depicted in FIG. 10 are possible.

Although specific embodiments of the invention have been described, various modifications, alterations, alternative constructions, and equivalents are also encompassed within the scope of the invention. The described invention is not restricted to operation within certain specific data processing environments, but is free to operate within a plurality of data processing environments. Additionally, although the present invention has been described using a particular series of transactions and steps, it should be apparent to those skilled in the art that the scope of the present invention is not limited to the described series of transactions and steps.

Further, while the present invention has been described using a particular combination of hardware and software, it should be recognized that other combinations of hardware and software are also within the scope of the present invention. The present invention may be implemented only in hardware, or only in software, or using combinations thereof.

The specification and drawings are, accordingly, to be regarded in an illustrative rather than a restrictive sense. It will, however, be evident that additions, subtractions, deletions, and other modifications and changes may be made thereunto without departing from the broader spirit and scope of the invention as set forth in the claims.

What is claimed is:

1. A method for distributed event processing, the method comprising:
   receiving, at one or more computer systems, a query associated with an event stream;
   identifying, with one or more processors associated with the one or more computer systems, a first set of properties associated with the event stream;
   identifying, with the one or more processor associated with the one or more computer systems, a second set of properties that satisfy one or more heuristics from the first set of properties;
   optimizing, with the one or more processor associated with the one or more computer systems, the query in response to the second set of properties that satisfy the one or more heuristics;
   generating, with one or more processors associated with the one or more computer systems, a request addressed to a first event processor hosted by the one or more computer systems for a first portion of event data associated with the event stream;
   receiving, at the one or more computer systems, information indicating that the first portion of event data was received at a second event processor hosted by the one or more computer systems;
   generating, with the one or more processors associated with the one or more computer systems, an event based on the first portion of event data; and
   storing the event in response to the query in a database associated with the one or more computer systems.

2. The method of claim 1 wherein generating, with the one or more processors associated with the one or more computer systems, the request addressed to the first event processor comprises generating an instruction to the first event processor indicating to locally query the event stream to generate the first portion of event data.

3. The method of claim 1 wherein generating, with the one or more processors associated with the one or more computer systems, the request addressed to the first event processor comprises generating an instruction to the first event processor indicating to collocate a subset of the event stream at the second event processor.

4. The method of claim 1 wherein the event stream comprises a virtual event stream having at least one event stream locally accessible to the first event processor and at least one event stream locally accessible to the second event processor.

5. The method of claim 1 wherein optimizing, with the one or more processor associated with the one or more computer systems, the query in response to the second set of properties that satisfy the one or more heuristics comprises rewriting the query to use remote mapping.

6. The method of claim 1 wherein optimizing, with the one or more processor associated with the one or more computer systems, the query in response to the second set of properties that satisfy the one or more heuristics comprises rewriting the query to use remote row sourcing.

7. The method of claim 1 further comprising:
   generating, with the one or more processor associated with the one or more computer systems, a request addressed to the second event processor for a second portion of event data associated with the event stream; and
   wherein generating, with the one or more processors associated with the one or more computer systems, the event based on the first portion of event data further comprises generating the event based on the second portion of event data.

8. A system for distributed event processing, the system comprising:
   a first event processor hosted by a first set of one or more computer systems and configured to receive event data associated with an event stream; and
   a second event processor hosted by a second set of one or more computer systems and configured to:
      receive a query associated with the event stream,
      identify a first set of properties associated with the event stream;
      identify a second set of properties that satisfy one or more heuristics from the first set of properties;
      optimize the query in response to the second set of properties that satisfy the one or more heuristics;
      generate a request addressed to the first event processor for a first portion of event data associated with the event stream,
      receive the first portion of event data, and
      generate an event based on the first portion of event data.

9. The system of claim 8 wherein the second event processor is further configured to receive a second portion of event data associated with the event stream and to generate the event based the first portion of event data and the second portion of event data.

10. The system of claim 8 wherein the second event processor is configured to generate the request addressed to the first event processor to include an instruction indicating to the first event processor to locally query the event stream to generate the first portion of event data.

11. The system of claim 8 wherein the second event processor is configured to generate the request addressed to the first event processor to include an instruction indicating to the first event processor to collocate a subset of the event stream at the second event processor.

12. The system of claim 8 wherein the event stream comprises a virtual event stream having at least one event stream locally accessible to the first event processor and at least one event stream locally accessible to the second event processor.

13. The system of claim 8 wherein the second event processor is further configured to rewrite the query to use remote mapping in response to the second set of properties that satisfy the one or more heuristics.

14. The system of claim 8 wherein the second event processor is further configured to rewrite the query to use remote row sourcing in response to the second set of properties that satisfy the one or more heuristics.

15. A computer program product stored on a non-transitory computer-readable medium and executable by one or more processors of one or more computer systems for distributed event processing, the computer program product comprising:
   code for receiving a query associated with an event stream;
   code for identifying a first set of properties associated with the event stream;

code for identifying a second set of properties that satisfy one or more heuristics from the first set of properties;

code for optimizing the query in response to the second set of properties that satisfy the one or more heuristics;

code for generating, based on the query, a request addressed to a first event processor for a first portion of event data associated with the event stream;

code for receiving information indicating that the first portion of event data was received at a second event processor; and code for generating an event based on the first portion of event data.

16. The computer program product of claim 15 wherein the code for generating the request addressed to the first event processor comprises code for generating an instruction to the first event processor indicating to locally query the event stream.

17. The computer program product of claim 15 wherein the code for generating the request addressed to the first event processor comprises code for generating an instruction to the first event processor indicating to collocate a subset of the event stream at the second event processor.

18. The computer program product of claim 15 wherein the code for optimizing the query in response to the second set of properties that satisfy the one or more heuristics comprises code for rewriting the query to use remote mapping.

19. The computer program product of claim 15 wherein the code for optimizing the query in response to the second set of properties that satisfy the one or more heuristics comprises code for rewriting the query to use remote row sourcing.

20. The computer program product of claim 15 further comprising code for generating a request addressed to the second event processor for a second portion of event data associated with the event stream; and wherein the code for generating the event based on the first portion of event data further comprises code for generating the event based on the second portion of event data.

21. The computer program product of claim 15 wherein the event stream comprises a virtual event stream having at least one event stream locally accessible to the first event processor and at least one event stream locally accessible to the second event processor.

* * * * *